US005139722A

United States Patent [19]

Lawton

[11] Patent Number: 5,139,722

[45] Date of Patent: Aug. 18, 1992

[54] METHOD OF FORMING CONCRETE STRUCTURES

[75] Inventor: Peter G. Lawton, Halifax, England

[73] Assignee: P. G. Lawton (Industrial Svcs.) Limited, Halifax, England

[21] Appl. No.: 810,345

[22] Filed: Dec. 17, 1991

Related U.S. Application Data

[63] Continuation of Ser. No. 287,126, Dec. 20, 1988, abandoned.

[30] Foreign Application Priority Data

Dec. 24, 1987 [GB] United Kingdom ................. 8730127

[51] Int. Cl.[5] .......................... B28B 3/02; B28B 7/36; B32B 7/14

[52] U.S. Cl. ...................................... 264/86; 156/230; 156/291; 264/219; 264/333; 264/338; 425/84

[58] Field of Search ................... 264/86, 333, 87, 219, 264/DIG. 48, 338; 156/291, 230; 425/84; 210/489, 492

[56] References Cited

U.S. PATENT DOCUMENTS

| | | | |
|---|---|---|---|
| 3,306,794 | 2/1967 | Humbert, Jr. | 156/291 X |
| 3,408,250 | 10/1968 | Finefrock | 156/291 X |
| 3,747,773 | 7/1973 | Jackson | 156/291 X |
| 4,004,049 | 1/1977 | Horwat et al. | 156/291 X |
| 4,035,220 | 7/1977 | Hammersmith | 156/291 |
| 4,147,580 | 4/1979 | Buell | 156/291 |
| 4,183,978 | 1/1980 | Hefele | 156/291 X |
| 4,529,079 | 7/1985 | Albertson | 156/291 X |
| 4,728,380 | 3/1988 | Jones et al. | 156/230 |
| 4,730,805 | 3/1988 | Yokota et al. | 264/86 X |
| 4,743,750 | 5/1988 | Adee | 156/295 X |
| 4,771,891 | 9/1988 | Sorensen et al. | 156/291 X |
| 4,776,916 | 10/1988 | Prunesti et al. | 156/291 |

FOREIGN PATENT DOCUMENTS

| | | | |
|---|---|---|---|
| 7310578 | 2/1975 | Netherlands | 264/333 |
| 1522280 | 5/1977 | United Kingdom . | |

*Primary Examiner*—Karen Aftergut
*Attorney, Agent, or Firm*—W. Thad Adams, III

[57] ABSTRACT

In pressing wet concrete between a ram and a mold to compact the concrete and express water from it so as to produce a molded slab, a layer of filter material is provided between the ram or the base of the mold and the concrete and the filter material is secured by a discontinuous coat of adhesive applied as a transfer to the ram and/or to the base of the mold. The adhesive is applied over a sufficient area of the filter material to secure adhesion of the filter material to the ram or base of the mold. The discontinuous adhesive coating is provided as a pattern of particles which covers substantially the entire area of the face of the filter and is present over between 2% and 15% of the total surface area of the filter material.

3 Claims, 2 Drawing Sheets

METHOD OF FORMING CONCRETE STRUCTURES

This application is a continuation of application Ser. No. 287,126, filed Dec. 20, 1988, now abandoned.

Concrete bodies such as paving stones or slabs are produced by inserting a wet concrete mix, which may or may not contain an aggregate, in a mould, and then compressing the concrete mix in the mould to compact the mix. Typically the moulding machine comprises a ram movable into and out of the upper portion of the mould, so that concrete mix is pressed between the base of the mould and the underside of the ram. During compression, the concrete mix is compacted and formed into the shape corresponding to the internal shape of the mould, but also, much of the water in the wet mix is expressed from the mix, and it is necessary to provide for the release of this water from the mould.

In order to facilitate removal of the compacted mix from the mould, it is conventional to place a sheet of filter material (e.g. filter paper) between the base of the mould and the mix and between the underside of the ram and the mix. The filter material acts as a parting medium between the mix on the one hand and the mould and ram on the other hand, but because of its porous nature, it also allows the expression of the water from the mix during moulding. It is necessary to provide foraminous surfaces on the base of the mould and the underside of the ram to allow the water to escape after it has passed through the filter material, and for this purpose, perforated metal plates may be attached respectively to the base of the mould and the underside of the ram.

Traditionally, the filter material has been a paper, but a paper filter sheet has to be discarded after it has been used to produce a single paving stone. In the Specification of United Kingdom Patent No: 1,575,000 there is described apparatus for producing concrete bodies in which the filter material is secured to the ram or the base of the mould as the case may be, so that it remains in the mould when the compacted concrete body is removed. That specification also describes the use of filter material made of thermo-plastic fibres such as polypropylene.

The use of filter material secured to the ram and/or base of the mould, particularly if it is made according to the preferred features described in Specification 1,575,000, enables the filter material to be used repeatedly in the manufacture of a number of concrete bodies, and in some instances, such a filter material has been used to produce some hundreds of concrete bodies before it was necessary to change it. However, with certain types of concrete mix, good results have not been achieved and in extreme cases, the filter material has become ineffective after only a small number of concrete bodies has been produced.

The present invention provides an improvement useable in all instances where the filter material is adhered to the ram and/or base of the mould, irrespective of the constitution of the filter material itself, though good, and in some instances exceptionally good, results have been obtained when the invention has been used with the preferred filter material described in Specification 1,575,000.

The invention is based on the discovery that the method of adhering the filter material to the supporting structure (i.e. ram or mould base or perforated plate) apparently plays a significant part in determining the performance of the filter material, especially with regard to the number of times that the filter material can be used before it has to be changed. The precise theory of operation is not understood, but it is believed that the effect of the adhesive on the flow of water through the filter material when water is being expressed from the concrete is of considerable importance.

According to a first aspect of this invention a method of producing concrete bodies comprises pressing wet concrete between a ram and a mould to compact the concrete and express water from it, there being a layer of filter material secured to at least one of the ram and the base of the mould by a discontinuous coat of adhesive applied over a sufficient area of the filter material to ensure the adhesion of the filter material to the ram and/or base of the mould under normal working conditions. References throughout this specification to the filter material being adhered to the ram or base of the mould, are to be taken to include adhesion of the filter material to a foraminous element such as a perforated plate which is itself secured to the underside of the ram or lying on the base of the mould.

The use of a discontinuous coating of adhesive ensures that there are significant areas of the filter material through which water can flow substantially unimpeded by adhesive due to substantial areas of the filter material being left uncovered between discrete particles of the adhesive. Prior to the present invention, the adhesive was applied as a continuous coat over the complete reverse face of filter material and therefore the adhesive has to be of such a nature that whilst providing the necessary adhesion, it also allowed some penetration by water. The water pressure during compacting may be of the order of 1200 to 1500 pounds per square inch, and during the pressing of the first slab, after a filter has been fitted, the adhesive coat (which may be on a plastics or paper carrier) was ruptured by the water over each hole in the perforated plate, so that the coating itself then had a series of holes formed through it. This did not provide any selectable control over the resistance to water flow.

Another way of stating this aspect of the invention is that in the production of concrete bodies by pressing wet concrete between a ram and a mould to compact the concrete and express water from it, and in which a filter material is secured to the face of at least one of the ram and the base of the mould, the rate of flow of water from the compacted concrete is regulated by preselecting the density of adhesive applied as a discontinuous coat to the side of the filter material which is in engagement with the ram and/or base of the mould.

Preferably the discontinuous coating adhesive is applied as a transfer to the filter material from a substrate on which the discontinuous coating of adhesive is formed. The actual method of transferring the coating to the filter material is conventional: the substrate is cut to the same size as the sheet of filter material; the substrate brought with its coated face into engagement with the reverse face of the filter material and the filter material and substrate pressed together. When the filter material is to be used, the substrate is When the filter material is to be used, the substrate is peeled off it, leaving the coating of adhesive on the reverse face of the filter material, ready for that face to be presented to the face of the ram or base of the mould.

According to a second aspect of the invention a filter for use in the production of concrete bodies comprises a sheet of water-permeable material having a discontinuous adhesive coating on one face thereof. Preferably the adhesive coating is carried on a substrate applied to the face of the filter material and releaseable from the adhesive to leave the coating on the filter material when the substrate is removed.

The following preferred features are applicable to both aspects of the invention.

It is preferred that the adhesive is applied to the filter medium in the form of discrete particles, and although the particles will not cover the entire surface of the filter material, it is preferred that the pattern of particles covers substantially the entire area of the face of the filter material which will contact the face of the ram or base of the mould.

According to a preferred feature of the invention the adhesive is present over between 2% and 15% of the total surface area of the filter material. The precise density of the adhesive coating will be preselected according to the type of concrete being moulded and in some instances according to other operating characteristics, but very useful results have been obtained with discontinuous adhesive substrates manufactured by Coated Specialities Limited of the following grades:

| | | |
|---|---|---|
| (i) | 1370 | 11% coated area: 22 grammes adhesive per square meter. |
| (ii) | 1536 | 8% coated area: 16 to 18 grammes adhesive per square meter. |
| (iii) | 1407 | 3% coated area: 4 to 6 grammes adhesive per square meter. |

The grade 1536 has been found to give particularly good results over a wide spectrum of concrete mixes.

One form of apparatus and its method of use in accordance with the invention will now be described by way of example only, with reference to the accompanying drawings, in which.

Figure 1:
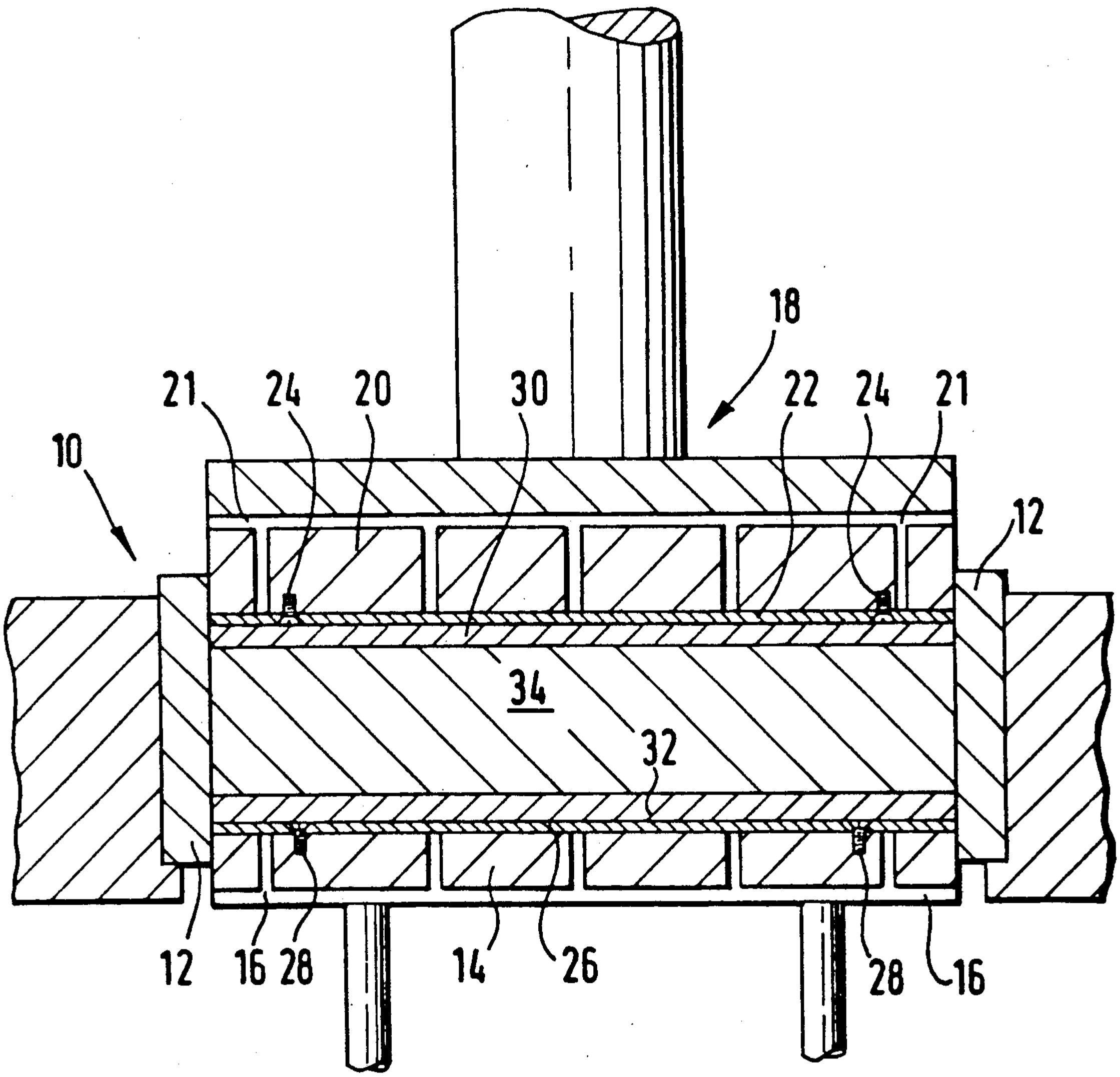
FIG. 1 is a cross-section through a mould.

The apparatus which is illustrated in FIG. 1, is intended to be used for forming concrete paving stones, and it generally comprises a mould 10 having side walls 12 which define a substantially rectangular cavity open at the top and bottom. The bottom surface of the mould 10 is closed by a lower press plate 14 which is adapted to be moved upwardly through the mould cavity by an injection mechanism (not shown). The lower press plate 14 is also provided with a series of drain holes and connecting channels 16 to allow liquid to drain therethrough from the mould cavity.

A ram mechanism indicated generally at 18 which includes a die-head is mounted above the mould 10 and is adapted to be moved downwardly towards the mould 10, and a compression plate 20 is mounted on the die-head of the ram mechanism 18. The compression plate 20 is arranged to be a close fit in the mould cavity and when the ram mechanism 18 moves downwardly towards the mould 10, the plate 20 slides into the open top of the mould cavity. The compression plate 20 is provided with a series of drain holes and connecting channels 21 through which liquid can be drawn from the mould cavity.

A perforated metal plate 22 is mounted on the lower surface of the compression plate 20 and is connected thereto by countersunk setscrews 24. The perforated metal plate 22 is arranged to conform closely in shape to the shape of the mould cavity and the edges thereof are ground to give a sharp arrice to the concrete body.

A similar perforated metal plate 26 is carried on the upper surface of the lower press plate 14. The perforated metal plate 26 provides an effective foraminous base for the mould, and the perforated metal plate 22 provides a foraminous bottom surface on the compression plate 20, which can be regarded as a ram.

Two layers of filter material 30 and 32 are provided which both closely conform to the shape of the mould cavity, and each layer of filter material 30,32 is formed of thermo-plastic fibres such as polypropylene fibres. In this particular arrangement, the upper and lower surfaces of the layers of filter material 30 and 32 are subjected to a hot calendering process to produce a surface of a smooth non-fibrous nature which is porous to water. The hot calendering process consists of, for example, passing the layer of filter material over a heated roller. The layers of filter material are cut to size by die stamping on a cutting press.

The layers of filter material 30 and 32 are secured to their associated metal plates 22 and 26 by means of a hot melt adhesive. The manner in which this adhesive is applied to the layers of filter material forms a significant feature of the present invention and will be described in some detail.

Figure 2:
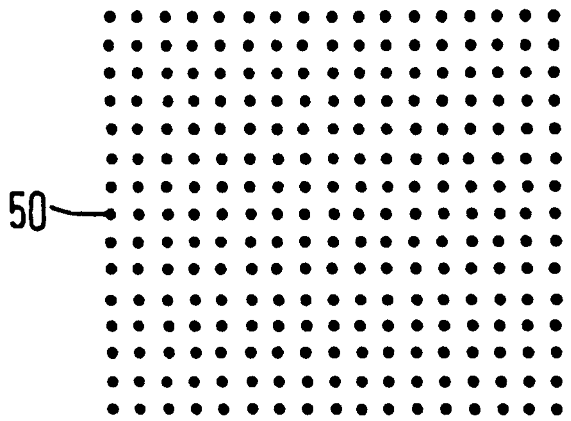
FIG. 2 shows part of the reverse face of a filter medium for use in the apparatus shown in FIG. 1, illustrating one form of discontinuous adhesive coating.

The adhesive is a hot melt adhesive and is provided in the form of a discontinuous coating on one face of a substrate. The substrate is in the form of a roll, but its two faces have a different release effect with respect to the adhesive, so that as the substrate is unrolled, all the adhesive is on one face. The discontinuous adhesive coating is applied to the substrate in the form of discrete particles 50 (see FIG. 2). These particles 50 may themselves be constituted by a plurality of very small individual particles grouped together in clusters, and it will be observed from FIG. 2, that the particles 50 are applied to the substrate in a pattern of ranks and files, which pattern covers the entire surface of the substrate. The particular pattern which is illustrated in FIG. 2 is that of a discontinuous adhesive coated substrate supplied by Coated Specialities Limited grade 1536, which provides adhesive over 8% of the total area of the substrate to a density of 16 to 18 grammes of adhesive per square meter. When the filter material 30 or 32 has been prepared it is placed in face-to-face contact with the substrate which is then cut to the same size as the filter material. The filter material and the substrate are then pressed together using a hot rotary ironer. In effect, the discontinuous adhesive coated substrate is a transfer, but the adhesive particles have sufficient tackiness to enable them to secure the substrate to the face of the filter material, particularly when subjected to the hot ironing process. The filter material with its substrate adhering thereto can be stored ready for use.

When a particular piece of filter material is to be used, the substrate is peeled off, leaving the pattern of adhesive particles 50 transferred on to the reverse face of the filter material. The filter material is then pressed with its reverse face against the top face of the perforated plate 26 or the underside of the perforated plate 22, to cause the filter material to adhere to its respective perforated plate.

The method of using the apparatus illustrated in FIG. 1 will now be described:

The lower press plate is disposed in the bottom of the mould cavity as illustrated in FIG. 1, with the layer of filter material 32 secured thereto. A quantity of wet concrete mix 34 is placed in the mould 10 to fill the mould cavity to the required depth, dependant upon the desired thickness of the paving stone which is to be produced.

The ram mechanism 18 is then operated to move the plate 20 downwardly into the mould 10 to the position illustrated in FIG. 1. During the movement, the concrete mix 34 is compressed between the layers of filter material 30 and 32 and the compaction of the concrete mix 34 causes water to be expressed from the concrete mix. This water passes through the porous surfaces of the layers of filter material 30 and 32 which will allow the passage of water, but retain the cement and other fines content in the concrete mix 34. The water flows through the filter material, then through the perforations of the metal plates 22 and 26, and thence out of the mould cavity via the series of holes and channels 16 and 21 formed in the lower press plate 14 and the compression plate 20. The concrete mix 34 takes up the shape of the concrete paving stone defined by the mould cavity.

After compression of the concrete mix 34, the compression plate 20 is withdrawn from the mould 10 by actuation of the ram mechanism 18, and the concrete paving stone is ejected from the mould cavity by actuating the ejection mechanism (not shown) which moves the lower press plate 14 upwardly through the mould 10.

The concrete paving stone thus formed is removed from the layer of filter material 32 which is attached to the lower press plate 14 and the paving stone is then allowed to cure. The layers of filter material 30 and 32 are retained on the compression plate 20 and the lower press plate 14 respectively and the apparatus can then be used to repeat the above operation and produce further concrete paving stones. The release of the paving stone from the layers of filter material 30 and 32 can be assisted by the impregnation thereof with a release agent such as, for example, a silicone.

It will be appreciated that the expression of water from the concrete mix during the compression thereof is a very important part of the method of manufacture just described. The discontinuous adhesive coating of the filter material plays an important part in facilitating the expression of water through the filter material and in the specific instance which has been described above, the water is able to flow unimpeded across the interface between the filter material and the perforated plate 22 or 26 over 92% of the surface area of that interface. Hence, the presence of the adhesive has a minimal effect on the expression of water from the mould, and it is thought that this plays an important part in the success of the invention in enabling the filter material applied to the ram and/or the base of the mould, to be used repeatedly for the production of a number of concrete slabs. At the same time, the overall pattern effect of the discrete particles of adhesive 50 has the effect of providing an adequate bonding of the filter material to its respective perforated plate.

It has been found that the compacted slab releases cleanly from the filter material, that is to say without significant attachment of the concrete to the face of the filter (which would destroy the effectiveness of the filter after a relatively few moulding operations as well as having a deleterious effect on the slab). Apparently the invention causes the concrete particles to have a greater affinity for each other than for the filter material and this causes them to remain in the slab rather than attaching to the filter.

Figure 3:
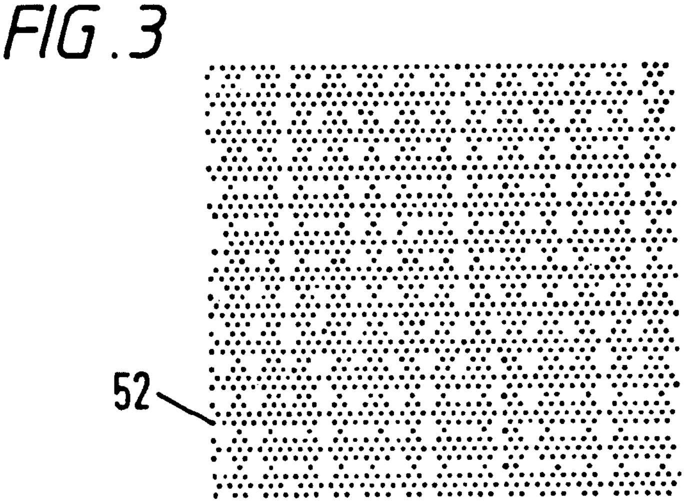
FIGS. 3 and 4 are views similar to FIG. 2, but showing alternative forms of adhesive coatings.
Figure 4:
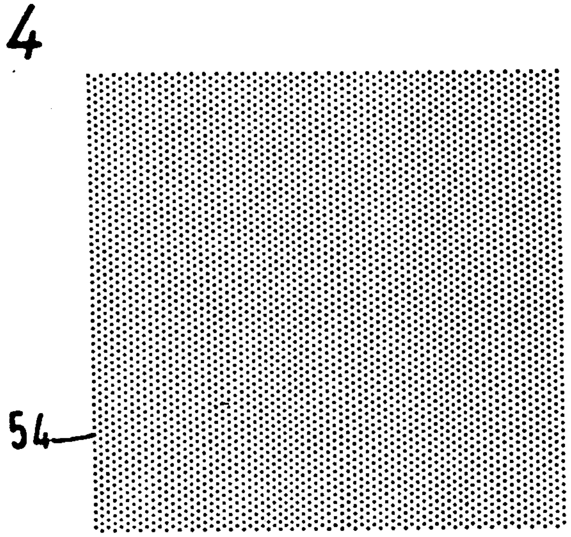

With certain types of concrete mix, it may be permissible to utilise a denser discontinuous adhesive coating such as the coatings illustrated in FIGS. 3 and 4. These coatings are still made up of discrete particles 52 and 54 of adhesive, but it will be noted that in FIG. 3 for instance, the particles are present in a much denser pattern than that illustrated in FIG. 2. In fact, FIG. 3 is an illustration of grade 1370 supplied by Coated Specialities Limited wherein 11% of the total surface area is covered by adhesive particles, giving a density of 22 grammes adhesive per square meter.

It is to be understood that the invention can be applied to any form of filter material, including the traditional paper filter materials, though if paper were used, it would probably be necessary to use thicker papers than those which have been discarded after a single operation.

I claim:

1. A method of producing concrete bodies in a mould, between a ram and a mould base, comprising the steps of: transferring a coat of discrete particles of adhesive from a substrate on which said discrete particles of adhesive are formed in a preselected density to one face of a layer of filter material over a sufficient area of said filter material to ensure adhesion of said filter material to said at least one of said ram and said mould base under normal working conditions, while leaving a substantial area of said one face of said layer of filter material uncovered between said discrete particles of adhesive to ensure substantially unimpeded flow of water through said substantial area; placing said layer of filter material in said mould; securing said layer of filter material to at least one of said ram and said mould base by said coat of discrete particles of adhesive; pressing wet concrete between said ram and said mould base to compact said concrete and express water from said concrete at a preselected flow rate, said preselected rate of flow of water from said concrete during said pressing being regulated by said preselected density of said discrete particles of adhesive transferred to said one face of said layer of filter material, to thus produce said concrete body in said mould.

2. A method of producing concrete bodies as claimed in claim 1, wherein said coat of discrete particles of adhesive extends over substantially an entire area of said one face of said layer of filter material.

3. A method of producing concrete bodies as claimed in claim 1 or claim 2, wherein said discrete particles of adhesive cover between 2% and 15% of a total surface area of said one face of said layer of filter material.

* * * * *